T. V. BUCKWALTER.
AXLE BEARING.
APPLICATION FILED AUG. 9, 1910.
987,854.
Patented Mar. 28, 1911.
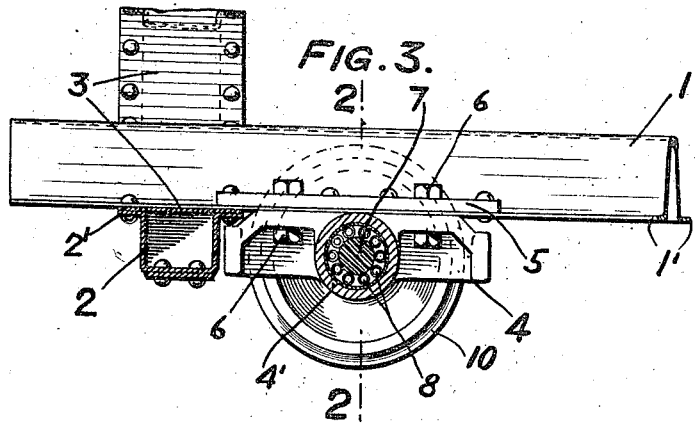
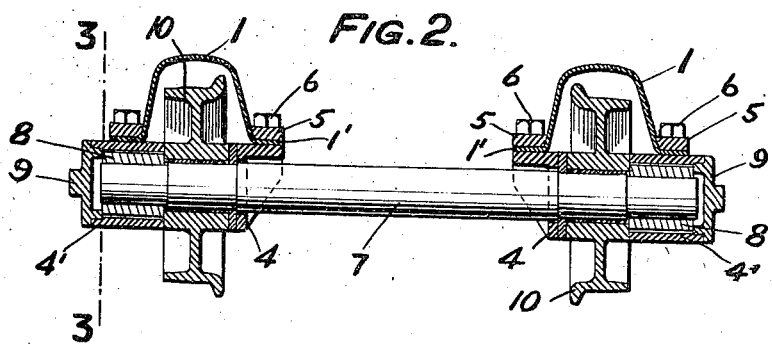
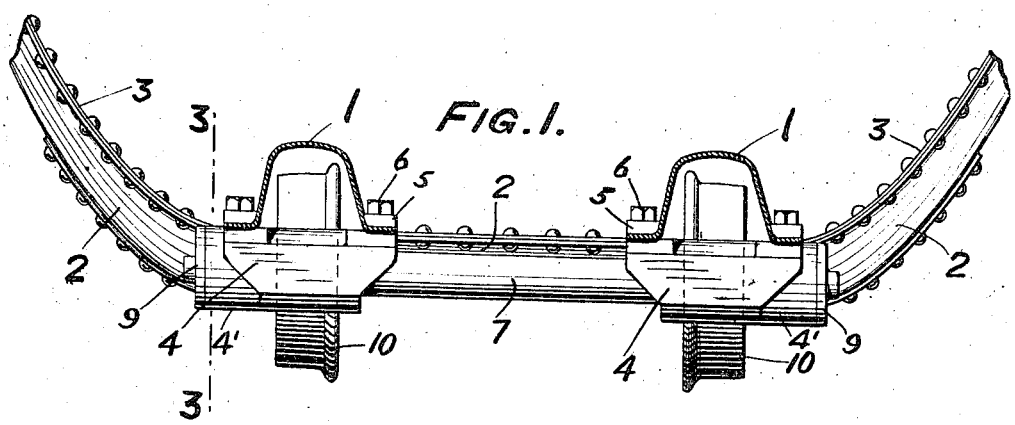
WITNESSES:
INVENTOR
Tracy V. Buckwalter
BY
Charles N. Butler
ATTORNEY.

UNITED STATES PATENT OFFICE.

TRACY V. BUCKWALTER, OF ALTOONA, PENNSYLVANIA.

AXLE-BEARING.

987,854.

Specification of Letters Patent. Patented Mar. 28, 1911.

Application filed August 9, 1910. Serial No. 576,344.

*To all whom it may concern:*

Be it known that I, TRACY V. BUCKWALTER, a citizen of the United States, residing at Altoona, in the county of Blair and State of Pennsylvania, have invented certain Improvements in Axle-Bearings, of which the following is a specification.

My improvements relate to axle bearings for trucks and they comprise a wheel housing for supporting a truck frame, an axle journaled therein, and wheels journaled on the axle, whereby the axle is free to rotate, each of the wheels has free rotary action on the axle, greater ease of curving is obtained, the friction is reduced to a minimum, the usual torsional effect is obviated, the power required to propel the load is reduced, and a compact, strong and efficient construction is provided.
In the accompanying drawings, Figure 1 is a sectional elevation of a tie truck to which my improvements are applied, Fig. 2 is a sectional elevation taken through the axis of the same on the line 2—2 of Fig. 3, and Fig. 3 is a sectional side elevation taken through the line 3—3 of Figs. 1 and 2.

The construction represented in the drawings comprises inverted U-shaped beams 1 forming the longitudinal sills of the truck;
substantially U-shaped beams 2 with cover plates 3 riveted to flanges 2' thereof, forming bolsters which are riveted to flanges 1' of the beams 1; and wheel housings 4 upon which the beams 1 are supported and held, the beams 1 having their flanges clamped between the housings 4 and the plates 5 by the bolts 6. The housings 4 are provided with the journal boxes 4', which contain the ends of the axles 7 and the anti-friction rollers 8 bearing thereon, the ends of the boxes being closed by the caps 9. Wheels 10 are journaled on the axles 7, within the housings 4, which are yoked on the wheels, the latter being hooded by the beams 1.

The load which the truck is designed to carry rests on the bolsters 2 and is transmitted therefrom through the beams 1, housings 4, rollers 8, and axles 7 to the traction wheels 10 which turn freely on the axles.

Having described my invention, I claim:

1. The combination of a housing having a journal box, with an axle, anti-friction bearings through which said axle supports said box, and a wheel journaled on said axle.

2. The combination of a truck frame, with an axle, rollers whereby said frame is supported on said axle, and wheels journaled on said axle.

3. The combination of a frame comprising an inverted substantially U-shaped beam, a housing upon which said beam is supported, an axle journaled in said housing, and a wheel journaled on said axle.

4. The combination of an axle, a wheel journaled on said axle, a housing yoked on said wheel, and bearing means whereby said axle is journaled in said housing.

5. The combination of an axle, with a wheel journaled on said axle, a housing yoked on said wheel, anti-friction rollers whereby said axle is journaled in said housing, and a beam supported by said housing, said beam forming a hood for said wheel.

6. The combination of journal boxes, with an axle, anti-friction bearings through which said axle supports said boxes, and wheels journaled on said axle.

In witness whereof I have hereunto set my name this fifth day of August, 1910, in the presence of the subscribing witnesses.

TRACY V. BUCKWALTER.

Witnesses:
ROBERT JAMES EARLEY,
JOHN C. HOWARD.

---

Copies of this patent may be obtained for five cents each, by addressing the "Commissioner of Patents, Washington, D. C."